(12) United States Patent
Maier

(10) Patent No.: US 7,455,241 B2
(45) Date of Patent: Nov. 25, 2008

(54) FUEL CELL COOLANT TEMPERATURE DETERMINATION METHOD

(75) Inventor: Oliver Maier, Worms (DE)

(73) Assignee: General Motors Corporation, Detroit, MI (US)

(*) Notice: Subject to any disclaimer, the term of this patent is extended or adjusted under 35 U.S.C. 154(b) by 539 days.

(21) Appl. No.: 10/967,780

(22) Filed: Oct. 18, 2004

(65) Prior Publication Data
US 2008/0265044 A1    Oct. 30, 2008

(51) Int. Cl.
*G05D 23/02* (2006.01)
*G05D 23/08* (2006.01)
*G01K 5/00* (2006.01)
*F01P 7/02* (2006.01)

(52) U.S. Cl. .................. 236/101 A; 236/93 R; 236/34; 374/187

(58) Field of Classification Search ............. 236/101 A, 236/93 R, 34, 34.5, 68 B, 78 D; 62/129, 62/196.1, 125, 196.4; 374/187
See application file for complete search history.

(56) References Cited

U.S. PATENT DOCUMENTS

| 3,559,883 | A | * | 2/1971 | Buiting et al. ............. 236/68 B |
| 3,782,121 | A | * | 1/1974 | Marcoux et al. .............. 60/527 |
| 5,135,163 | A | * | 8/1992 | Cho ......................... 236/93 A |
| 6,101,988 | A | * | 8/2000 | Evans ......................... 123/41.5 |
| 6,569,550 | B2 | * | 5/2003 | Khelifa ......................... 429/13 |
| 2004/0074894 | A1 | * | 4/2004 | Santanam .................... 219/494 |

* cited by examiner

*Primary Examiner*—Chen-Wen Jiang

(57) ABSTRACT

A method of determining a temperature of a coolant in a coolant circulation system is disclosed. The coolant circulation system includes a coolant flow valve having a valve housing and an expansion element provided in the valve housing for controlling flow of the coolant through the valve housing. According to the method, an ohmic resistance of the expansion element is measured. The temperature of the coolant is determined by correlating the ohmic resistance of the expansion element with the temperature of the coolant.

21 Claims, 2 Drawing Sheets

US 7,455,241 B2

FUEL CELL COOLANT TEMPERATURE DETERMINATION METHOD

TECHNICAL FIELD

The present invention relates to cooling systems for fuel cells. More particularly, the present invention relates to a method for determining the temperature of a fuel cell stack coolant by correlating the coolant temperature with the ohmic resistance of an expansion element in a coolant flow valve in order to operate the coolant flow valve on the basis of the measured coolant temperature to maintain the coolant at an optimum temperature.

BACKGROUND OF THE INVENTION

Fuel cell technology is a relatively recent development in the automotive industry. It has been found that fuel cell power plants are capable of achieving efficiencies as high as 55%. Furthermore, fuel cell power plants emit only heat and water as by-products.

Electrochemical conversion of energy has proven to be an important alternative propulsion source for automotive applications. In a fuel cell system, energy is produced through the cold combustion (reaction) of hydrogen and oxygen. The reaction takes place in a fuel cell stack, in which individual fuel cells are stacked together in series to generate increasingly larger quantities of electricity.

While they are a promising development in automotive technology, fuel cells are characterized by a high operating temperature which presents a significant design challenge from the standpoint of maintaining the structural and operational integrity of the fuel cell stack. Maintaining the fuel cell stack within the temperature ranges that are required for optimum fuel cell operation depends on a highly-efficient cooling system which is suitable for the purpose. The heat generated by the energy conversion process carried out in a fuel cell stack is removed from the stack through a coolant circulation system.

A typical coolant circulation system for a fuel cell vehicle includes a pump which pumps coolant through a fuel cell stack, a chiller through which the coolant from the stack may flow for cooling, a bypass loop which bypasses the chiller, a two-way coolant flow valve which distributes the coolant through either the chiller or the bypass loop, and stack inlet and stack outlet temperature sensors. If the coolant temperature as measured by the stack inlet and stack outlet temperature sensors is excessively high, the coolant flow valve permits flow of the coolant through the chiller to cool the coolant to a desired temperature before the coolant is distributed into the stack. On the other hand, if the temperature of the coolant is optimum or too low, the coolant flow valve shunts the coolant from the chiller through the bypass loop. The coolant remains at substantially the same temperature as it is distributed into the stack.

The two-way valve typically includes a performance-map thermostat having a wax expansion element. The expansion element is electrically coupled to a heating system which controls the temperature of the expansion element independently of the coolant temperature. The density and volume of the expansion element change depending on the temperature of the element. Therefore, when it is unheated, the expansion element is in a contracted configuration and blocks flow of coolant from the chiller to the stack while facilitating flow of the coolant from the bypass loop to the stack. When it is heated, on the other hand, the expansion element expands and facilitates flow of coolant from the chiller to the stack while blocking flow of the coolant from the bypass loop to the stack.

The heating system which induces heating of the expansion element is controlled by the stack inlet and stack outlet temperature sensors. Since heating of the expansion element acts through a linear (ohmic) resistance, the ohmic resistance of the expansion element is correlated with the valve outlet or stack inlet temperature of the coolant.

Therefore, by determining the stack inlet temperature of the coolant based on the ohmic resistance of the expansion element, the stack inlet temperature sensor can be eliminated from the coolant circuit. This reduces costs and eliminates sensor assembly and defect problems. Furthermore, additional space is made available for other components or systems.

SUMMARY OF THE INVENTION

The present invention is generally directed to a novel method for determining the stack inlet temperature of a fuel cell coolant. The method is suitable for use in a coolant circulation system having a coolant pump which pumps coolant through a fuel cell stack, a chiller for cooling coolant from the stack, a chiller bypass loop which bypasses the chiller, a two-way coolant flow valve which distributes the coolant through either the chiller or the chiller bypass loop depending on the temperature of the coolant, and a stack outlet temperature sensor. The coolant flow valve includes a performance-map thermostat having a wax expansion element. When the temperature of the coolant is optimum or below optimum, the wax expansion element remains in an unheated, contracted state to block flow of coolant from the chiller and facilitate flow of coolant from the bypass loop to the stack. When the temperature of the coolant is excessively high, the expansion element is heated to expand and facilitate flow of the coolant from the chiller to the stack.

According to the method of the present invention, the ohmic resistance of the expansion element is initially determined. The ohmic resistance is then correlated with the coolant stack inlet temperature. The coolant stack inlet temperature, typically in combination with the coolant stack outlet temperature, is used to determine whether the expansion element should be heated to facilitate flow of coolant through the chiller or maintained in the unheated condition to facilitate flow of the coolant through the chiller bypass loop, in order to maintain the temperature of the coolant within optimum levels.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
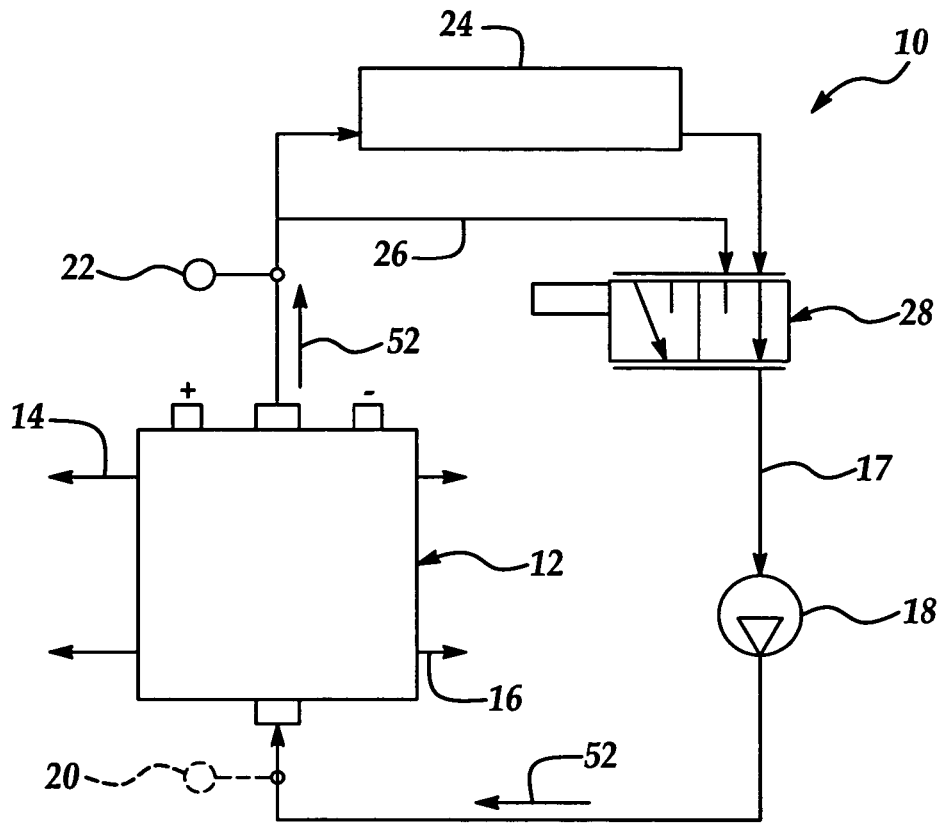
FIG. 1 is a schematic view of a coolant circulation system which is suitable for implementation of the present invention.
Figure 2:
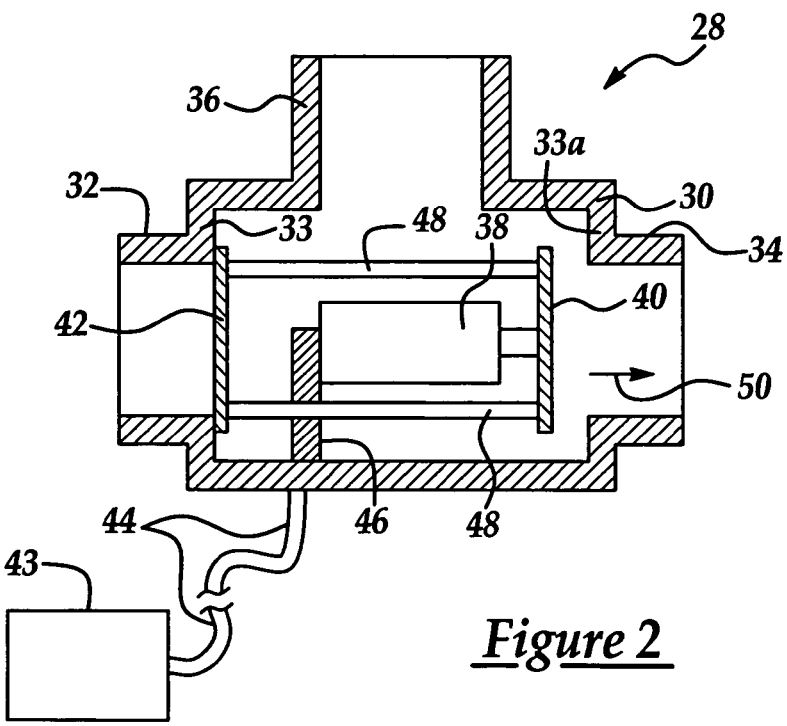
FIG. 2 is a cross-section of a coolant flow valve of the coolant circulation system of FIG. 1.

Referring initially to FIGS. 1 and 2, a coolant circulation system which is suitable for implementation of the method of the present invention is generally indicated by reference numeral 10 in FIG. 1. The coolant circulation system 10 may have conventional components, unless otherwise noted. The coolant circulation system 10 includes a coolant circuit 17 which is connected to a coolant inlet and a coolant outlet of a fuel cell stack 12. The fuel cell stack 12 is confluently connected to a cathode circuit 14 and an anode circuit 16. A coolant pump 18 is provided in the coolant circuit 17, upstream of the fuel cell stack 12, for pumping a liquid coolant 52 through the coolant circulation system 10. A stack outlet temperature sensor 22 is provided in the coolant circuit 17 at the outlet end of the fuel cell stack 12. A stack inlet temperature sensor 20 (shown in phantom) may be omitted from or included in the coolant circuit 17, at the inlet end of the fuel cell stack 12, as will be hereinafter described.

A coolant chiller 24 is provided in the coolant circuit 17, downstream of the stack outlet temperature sensor 22. A chiller bypass loop 26 is provided in the coolant circuit 17, between the stack outlet temperature sensor 22 and the coolant chiller 24. Both the coolant chiller 24 and the chiller bypass loop 26 are connected to a two-way coolant flow valve 28. The coolant flow valve 28 is connected to the inlet side of the coolant pump 18.

As shown in FIG. 2, the coolant flow valve 28 typically includes a valve housing 30 having a chiller inlet arm 32, a bypass loop inlet arm 34 which is typically disposed in axial alignment with the chiller inlet arm 32, and a valve outlet arm 36 which is typically perpendicular to the chiller inlet arm 32 and bypass loop inlet arm 34. The chiller inlet arm 32 is confluently connected to the coolant chiller 24, whereas the bypass loop inlet arm 34 is confluently connected to the chiller bypass loop 26.

A wax expansion element 38 is provided inside the valve housing 30, between the chiller inlet arm 32 and the bypass loop inlet arm 34. The expansion element 38 is typically mounted on a support 46 that is provided in the valve housing 30. The expansion element 38 engages a bypass side base plate 40 which is connected to a chiller side base plate 42 through multiple rods 48. A heating system 43 is electrically connected to the expansion element 38 through an electrical connection 44.

Accordingly, when the expansion element 38 is unheated by the heating system 43, the chiller side base plate 42 engages a housing shoulder 33 in the valve housing 30 to seal the chiller inlet arm 32 from the valve outlet arm 36. On the other hand, when the expansion element 38 is heated by the heating system 43 via the electrical connection 44, the expansion element 38 undergoes thermal expansion and pushes against the bypass side base plate 40. This, in turn, causes the rods 48 to slide with respect to the support 46 in the direction indicated by the arrow 50. Therefore, the chiller side base plate 42 disengages the housing shoulder 33 to establish fluid communication between the chiller inlet arm 32 and the valve inlet arm 36, whereas the bypass side base plate 40 simultaneously engages a housing shoulder 33a and seals the bypass loop inlet arm 34 from the valve outlet arm 36.

In conventional operation of the coolant circulation system 10, the coolant pump 18 pumps the liquid coolant 52 through the coolant circuit 17 and fuel cell stack 12. Thermal exchange occurs between the fuel cell stack 12 and the coolant 52 to dissipate excess heat from the fuel cell stack 12 into the coolant 52. Heated coolant 52 is distributed from the fuel cell stack 12 and then through either the coolant chiller 24 or the chiller bypass loop 26, depending on whether the temperature of the heated coolant 52 is excessive and requires cooling.

Responsive to input from the stack inlet temperature sensor 20 and the stack outlet temperature sensor 22, the heating system 43 either does not heat the expansion element 38 or heats the expansion element 38 to cause thermal expansion of the expansion element 38 in the valve housing 30. In the event that the temperature of the coolant 52 is at or below an optimum level, the expansion element 38 is not heated by the heating system 43, and thus, remains at a constant phase condition and size. Therefore, the chiller side base plate 42 engages the shoulder 33 and prevents flow of the coolant 52 from the chiller 24; through the chiller inlet arm 32 and valve outlet arm 36, respectively, of the valve housing 30; and to the fuel cell stack 12. This maintains the coolant 52 at or below the optimum temperature.

In the event that the temperature of the coolant 52 is above the optimum level, the expansion element 38 is heated by the heating system 43. Therefore, due to the resulting thermally-induced phase change in the wax expansion element 38, the element 38 expands and pushes against the bypass side base plate 40. This causes the rods 48 to slide with respect to the support 46 in the direction indicated by the arrow 50 until the chiller side base plate 42 disengages the shoulder 33 and the bypass side base plate 40 engages the shoulder 33a. Consequently, coolant 52 is allowed to flow from the chiller 24; through the chiller inlet arm 32 and valve outlet arm 36, respectively, of the housing 30; and to the fuel cell stack 12. Therefore, the temperature of the coolant 52 decreases to the optimum temperature for operation of the fuel cell stack 12 prior to entry into the fuel cell stack 12.

According to the method of the present invention, the stack inlet temperature of the coolant 52 can be determined without the use of the stack inlet temperature sensor 20. The ohmic resistance of the expansion element 38 is initially determined. The ohmic resistance of the expansion element 38 is then correlated with the stack inlet temperature of the coolant 52, which stack inlet temperature of the coolant 52 is conventionally measured by the stack inlet temperature sensor 20. This stack inlet temperature of the coolant 52 is used to determine whether the expansion element 38 requires heating to facilitate flow of coolant 52 through the chiller 24 and to the fuel cell stack 12, respectively, or whether the expansion element 38 does not require heating to facilitate flow of the coolant 52 through the chiller bypass loop 26, in order to maintain the temperature of the coolant 52 within optimum levels.

Because heating of the expansion element 38 by the heating system 43 acts through a linear (ohmic) resistance, the ohmic resistance is correlated with the stack inlet temperature of the coolant 52 as the coolant 52 enters the fuel cell stack 12. According to Ohm's law, electromotive force is related to current and resistance by the following equation:

$$E = I*R$$

where E is the electromotive force measured in volts, I is the current in amperes, and R is the resistance in ohms. Because the supply voltage (E) is known, the linear relationship between the resistance values (R) and the stack inlet temperature of the coolant can be determined. If the expansion element 38 is unheated by the heating system 43, then the resistance values (R) can be converted into the stack inlet temperature of the coolant 52. These resistance values have been plotted on the graph of FIG. 3, in which the ohmic resistances of the expansion element 38 have been plotted along the Y-axis and the stack inlet temperatures of the coolant 52 have been plotted along the X-axis.

Figure 3:
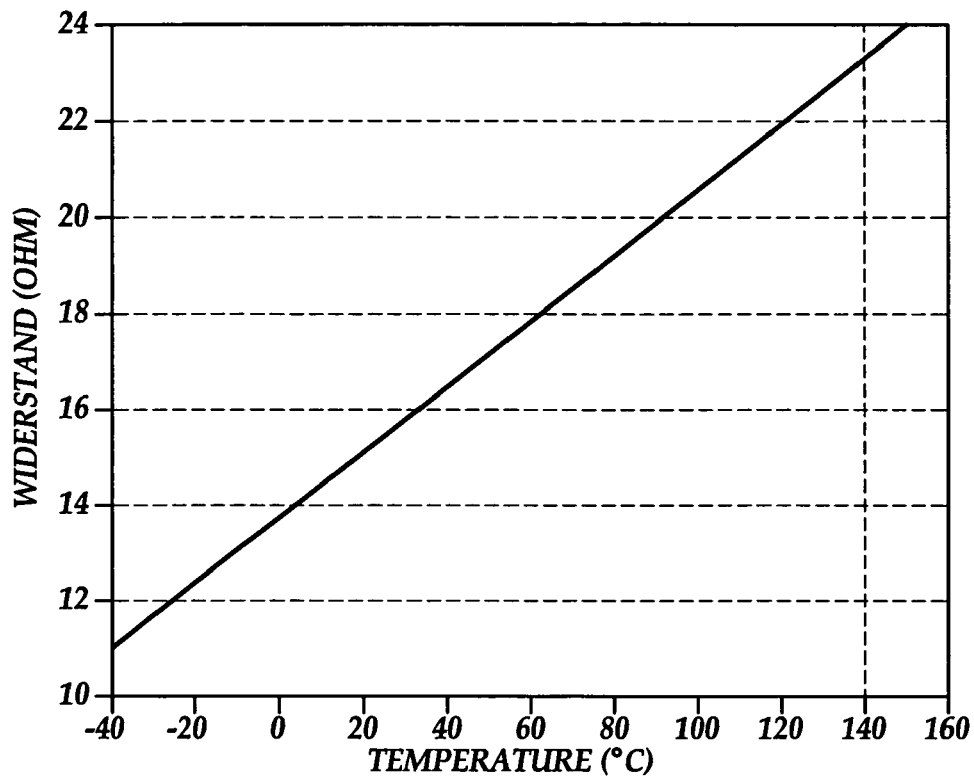
FIG. 3 is a line graph in which ohmic resistance of an expansion element in a coolant flow valve is correlated with coolant stack inlet temperature.
Figure 4:
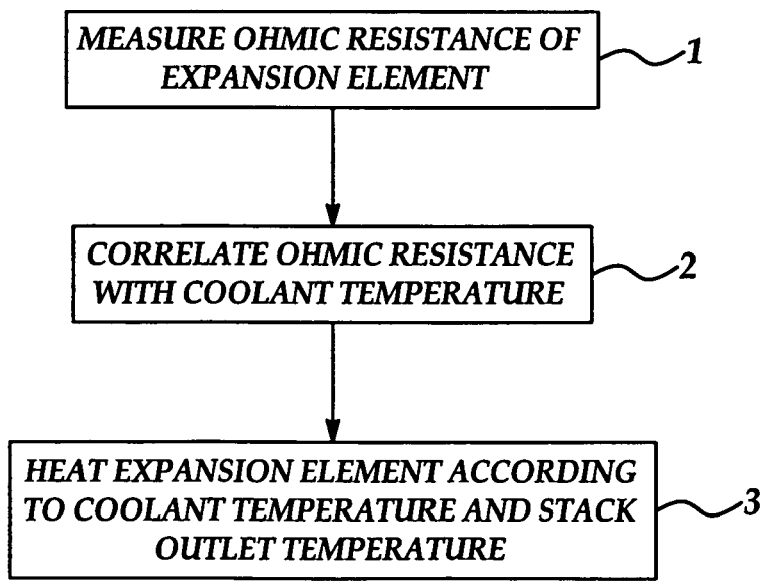
FIG. 4 is a flow diagram which illustrates sequential process steps carried out according to the method of the present invention.

Referring next to the flow diagram of FIG. 4, in conjunction with FIGS. 1-3, in implementation of the method of the present invention, the coolant pump 18 pumps liquid coolant 52 through the coolant circuit 17 and fuel cell stack 12 to dissipate heat from the fuel cell stack 12 to the coolant 52. The coolant 52 is distributed from the fuel cell stack 12 through either the chiller 24 or the chiller bypass loop 26, depending on whether the coolant 52 requires cooling. Such distribution of the coolant 52 through the chiller 24 or chiller bypass loop 26 is effected by controlling the thermal state of the expansion element 38. Therefore, the method of the present invention is used to determine the inlet temperature of the coolant 52, which is typically used in conjunction with the outlet temperature of the coolant 52 to determine whether or not the expansion element 38 requires heating.

According to the method of the invention, the ohmic resistance of the expansion element 38 is initially determined using conventional techniques known to those skilled in the art, as shown in step 1 of FIG. 4. In series production the resistance map of the expansion elements 38 has a low deviation, so a standard map can be used. For better results an adaptation of the resistance map can be done by comparison of the calculated temperature with the temperature sensor 22 signal at system start up or other operation modes. The resistance can be calculated by the resistance map, the Ohm's law, the known supply voltage and the measured current. Next, using the graph of FIG. 3, the ohmic resistance determined in step 1 is correlated with the stack inlet temperature of the coolant, as shown in step 2. For example, according to FIG. 3, a resistance of 18 ohms correlates with a coolant temperature of about 62° C. The coolant stack inlet temperature determined in step 2 is then used, in conjunction with the coolant outlet temperature determined by the stack outlet temperature sensor 22, to determine whether the expansion element 38 should remain unheated or should be heated. This may be carried out using conventional steps. In the event that the stack inlet temperature of the coolant 52 is below or at the optimum temperature level, the expansion element 38 remains unheated. Therefore, the chiller side base plate 42 engages the housing shoulder 33 to prevent flow of the coolant 52 from the chiller 24; through the chiller inlet arm 32 and valve outlet arm 36, respectively, of the valve housing 30; and to the fuel cell stack 12. Simultaneously, the bypass side base plate 40 remains disengaged from the shoulder 33a to facilitate flow of the coolant 52 from the chiller bypass loop 26; through the bypass loop inlet arm 34 and valve outlet arm 36, respectively, of the valve housing 30; and to the fuel cell stack 12. Consequently, the stack inlet temperature of the coolant 52 is maintained at or below the optimum temperature level for operation of the fuel cell stack 12.

In the event that the stack inlet temperature of the coolant 52 exceeds the predetermined optimum temperature level for the coolant 52, on the other hand, the heating system 43 heats the expansion element 38, thus inducing a phase shift in the expansion element 38 and causing the expansion element 38 to expand in the direction of the arrow 50 in FIG. 2. Accordingly, the base plate 40 engages the shoulder 33a, thereby preventing flow of the coolant 52 from the chiller bypass loop 26; through the bypass loop inlet arm 34 and valve outlet arm 36, respectively, of the valve housing 30; and to the fuel cell stack 12. Simultaneously, the base plate 42 disengages the shoulder 33, thereby permitting flow of the coolant 52 from the chiller 24; through the chiller inlet arm 32 and valve outlet arm 36, respectively, of the valve housing 30; and to the fuel cell stack 12. Consequently, the stack inlet temperature of the coolant 52 is reduced to the optimum temperature level for operation of the fuel cell stack 12. Depending on the thermal/phase state of the expansion element 38, an intermediate position of the expansion element 38 is possible in which one portion of the coolant 52 flows from the coolant chiller 24, through the coolant flow valve 28 and to the fuel cell stack 12, respectively, and another portion of the coolant 52 simultaneously flows from the chiller bypass loop 26, through the coolant flow valve 28 and to the fuel cell stack 12, respectively. Steps 1-3 of the invention, as heretofore described with respect to FIG. 4, may be repeated as often as is deemed necessary to maintain the stack inlet temperature of the coolant 52 as close as possible to the optimum coolant temperature.

It will be appreciated by those skilled in the art that the method of the present invention permits omission of the stack inlet temperature sensor 20 from the coolant circulation system 10. Therefore, the cost and assembly/defect problems associated with the stack inlet temperature sensor 20 are eliminated. Furthermore, omission of the stack inlet temperature sensor 20 provides additional space onboard the fuel cell vehicle for other components or systems, as needed. Alternatively, the stack inlet temperature sensor 20 may remain in the coolant circulation system 10, in which case the stack inlet temperature sensor 20 and the stack outlet temperature sensor 22 may be used to balance each other. This results in more accurate readings obtained by both of the sensors 20, 22. Since the temperature control method is model-based, adequate coolant temperature control can be maintained in the event that both of the sensors 20, 22 fail. Moreover, the principle of the invention can be adapted for use in the coolant circuit of an internal combustion engine.

While the preferred embodiments of the invention have been described above, it will be recognized and understood that various modifications can be made in the invention and the appended claims are intended to cover all such modifications which may fall within the spirit and scope of the invention.

The invention claimed is:

1. A method of determining a temperature of a coolant in a coolant circulation system, comprising:
   providing a coolant and a coolant circulation system, and circulating the coolant in the circulation system;
   providing a coolant flow valve in said coolant circulation system, said coolant flow valve comprising a valve housing and an expansion element provided in said valve housing for controlling flow of said coolant through said valve housing;
   measuring an ohmic resistance of said expansion element; and
   correlating said ohmic resistance of said expansion element with said temperature of said coolant.

2. The method of claim 1 wherein said correlating said ohmic resistance of said expansion element with said temperature of said coolant comprises providing a graph having values of said ohmic resistance plotted against values of said temperature of said coolant.

3. The method of claim 1 further comprising controlling expansion of said expansion element according to said temperature of said coolant.

4. The method of claim 3 wherein said controlling expansion of said expansion element according to said temperature of said coolant comprises preventing expansion of said expansion element when said temperature of said coolant does not exceed an optimum temperature value and inducing expansion of said expansion element when said temperature of said coolant exceeds said optimum temperature value.

5. The method of claim 3 wherein said coolant flow valve comprises a valve housing having a chiller inlet arm, a bypass loop inlet arm and a valve outlet arm, and wherein said controlling expansion of said expansion element according to said temperature of said coolant comprises facilitating blockage of said chiller inlet arm by said expansion element when said temperature of said coolant meets does not exceed an optimum temperature value and facilitating thermal expansion of said expansion element to unblock said chiller inlet arm when said temperature of said coolant exceeds said optimum temperature value.

6. The method of claim 3 wherein said correlating said ohmic resistance of said expansion element with said temperature of said coolant comprises providing a graph having values of said ohmic resistance plotted against values of said temperature of said coolant.

7. The method of claim 6 wherein said controlling expansion of said expansion element according to said temperature of said coolant comprises preventing expansion of said expansion element when said temperature of said coolant does not exceed an optimum temperature value and inducing expansion of said expansion element when said temperature of said coolant exceeds said optimum temperature value.

8. The method of claim 6 wherein said coolant flow valve comprises a valve housing having a chiller inlet arm, a bypass loop inlet arm and a valve outlet arm, and wherein said controlling expansion of said expansion element according to said temperature of said coolant comprises facilitating blockage of said chiller inlet arm by said expansion element when said temperature of said coolant meets does not exceed an optimum temperature value and facilitating thermal expansion of said expansion element to unblock said chiller inlet arm when said temperature of said coolant exceeds said optimum temperature value.

9. A method of determining a temperature of a coolant in a coolant circulation system, comprising:
providing a coolant flow valve in said coolant circulation system, said coolant flow valve comprising a valve housing having a chiller inlet arm for receiving coolant from a chiller, a bypass loop inlet arm opposite said chiller inlet arm for receiving coolant from a chiller bypass loop, a valve outlet arm between said chiller inlet arm and said bypass loop inlet arm, and an expansion element provided in said valve housing for selectively sealing said chiller inlet arm and said bypass loop inlet arm, and further comprising measuring an ohmic resistance of said expansion element; and
correlating said ohmic resistance of said expansion element with said temperature of said coolant.

10. The method of claim 9 wherein said correlating said ohmic resistance of said expansion element with said temperature of said coolant comprises providing a graph having values of said ohmic resistance plotted against values of said temperature of said coolant.

11. The method of claim 9 further comprising controlling expansion of said expansion element according to said temperature of said coolant.

12. The method of claim 11 wherein said controlling expansion of said expansion element according to said temperature of said coolant comprises preventing expansion of said expansion element when said temperature of said coolant does not exceed an optimum temperature value and inducing expansion of said expansion element when said temperature of said coolant exceeds said optimum temperature value.

13. The method of claim 11 further comprising blocking said chiller inlet arm by said expansion element when said temperature of said coolant meets does not exceed an optimum temperature value and facilitating thermal expansion of said expansion element to unblock said chiller inlet arm when said temperature of said coolant exceeds said optimum temperature value.

14. The method of claim 11 wherein said correlating said ohmic resistance of said expansion element with said temperature of said coolant comprises providing a graph having values of said ohmic resistance plotted against values of said temperature of said coolant.

15. The method of claim 14 wherein said controlling expansion of said expansion element according to said temperature of said coolant comprises preventing expansion of said expansion element when said temperature of said coolant does not exceed an optimum temperature value and inducing expansion of said expansion element when said temperature of said coolant exceeds said optimum temperature value.

16. The method of claim 14 blocking said chiller inlet arm by said expansion element when said temperature of said coolant does not exceed an optimum temperature value and expanding said expansion element to unblock said chiller inlet arm when said temperature of said coolant exceeds said optimum temperature value.

17. A method of determining a temperature of a coolant in a fuel cell coolant circulation system having a coolant chiller and a chiller bypass loop bypassing said chiller, comprising:
providing a coolant and a coolant circulation system, and circulating the coolant in the circulation system, the coolant system comprising a fuel cell stack constructed and arranged to be cooled by the coolant, a chiller to cool the coolant and a bypass loop connected to the fuel cell and constructed and arranged to flow coolant exiting the fuel cell around the chiller;
providing a coolant flow valve in fluid communication with said chiller, said coolant flow valve comprising a valve housing having a chiller inlet arm for receiving coolant from said chiller, a bypass loop inlet arm opposite said chiller inlet arm for receiving coolant from said chiller bypass loop, a valve outlet arm between said chiller inlet arm and said bypass loop inlet arm, an expansion element provided in said valve housing, and first and second base plates engaged by said expansion element for selectively sealing said chiller inlet arm and said bypass loop inlet arm, respectively, and further comprising measuring an ohmic resistance of said expansion element; and
correlating said ohmic resistance of said expansion element with said temperature of said coolant.

18. The method of claim 17 wherein said correlating said ohmic resistance of said expansion element with said temperature of said coolant comprises providing a graph having values of said ohmic resistance plotted against values of said temperature of said coolant.

19. The method of claim 17 further comprising selectively sealing said chiller inlet arm and said bypass loop inlet arm by controlling expansion of said expansion element according to said temperature of said coolant.

20. The method of claim 19 wherein said controlling expansion of said expansion element according to said temperature of said coolant comprises causing said first base plate to seal said chiller inlet arm and said second base plate to unblock said bypass loop inlet arm by preventing expansion of said expansion element when said temperature of said coolant does not exceed an optimum temperature value and causing said first base plate to unblock said chiller inlet arm and said second base plate to seal said bypass loop inlet arm by inducing expansion of said expansion element when said temperature of said coolant exceeds said optimum temperature value.

21. A method of determining a temperature of a coolant in a coolant circulation system, comprising:
providing a coolant and a coolant circulation system, and circulating the coolant in the circulation system;
providing a coolant flow valve in said coolant circulation system, said coolant flow valve comprising a valve housing and an expansion element provided in said valve housing for controlling flow of said coolant through said valve housing;

measuring an ohmic resistance of said expansion element; and correlating said ohmic resistance of said expansion element with said temperature of said coolant; and further comprising providing a fuel cell stack operatively connected to the coolant circulation system to cool the fuel cell stack; and wherein the coolant circulation system comprises a chiller connected to the fuel cell stack and a bypass loop connected to the fuel cell to flow coolant around the chiller, the valve housing comprising a chiller inlet arm connected to the chiller for receiving coolant from a chiller, a bypass loop inlet arm opposite said chiller inlet arm connected to the bypass loop for receiving coolant from a chiller bypass loop, a valve outlet arm between said chiller inlet arm and said bypass loop inlet arm, and said expansion element provided in said valve housing, and first and second base plates engaged by said expansion element for selectively sealing said chiller inlet arm and said bypass loop inlet arm, respectively.

\* \* \* \* \*